United States Patent
Lavoie et al.

(10) Patent No.: US 10,286,953 B2
(45) Date of Patent: May 14, 2019

(54) AUTOPARK STEERING WHEEL SNAP REDUCTION

(71) Applicant: Ford Global Technologies, LLC, Dearborn, MI (US)

(72) Inventors: Erick Michael Lavoie, Dearborn, MI (US); Nathaniel Abram Rolfes, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 729 days.

(21) Appl. No.: 14/488,589

(22) Filed: Sep. 17, 2014

(65) Prior Publication Data

US 2016/0075369 A1    Mar. 17, 2016

(51) Int. Cl.
    *B62D 15/02*    (2006.01)
(52) U.S. Cl.
    CPC ................. *B62D 15/0285* (2013.01)
(58) Field of Classification Search
    CPC .................................. B62D 15/0285
    USPC ....................................... 180/204
    See application file for complete search history.

(56) References Cited

U.S. PATENT DOCUMENTS

| | | | |
|---|---|---|---|
| 6,367,407 B1 | 4/2002 | DiGian, Jr. | |
| 8,265,827 B2 | 9/2012 | Iwata et al. | |
| 8,406,958 B2 | 3/2013 | Kim | |
| 8,666,601 B1 | 3/2014 | Van Wiemeersch et al. | |
| 8,692,687 B2 | 4/2014 | Ghisio et al. | |
| 9,919,733 B2 * | 3/2018 | Minaki | B62D 5/04 |
| 9,937,956 B2 * | 4/2018 | Kim | B62D 5/0463 |
| 10,144,448 B2 * | 12/2018 | Minaki | B62D 6/00 |
| 2003/0050748 A1 | 3/2003 | Iwazaki | |
| 2005/0043871 A1 | 2/2005 | Endo et al. | |
| 2008/0091320 A1 * | 4/2008 | Sakai | B62D 15/0285 701/42 |
| 2008/0133087 A1 * | 6/2008 | Klein | B62D 5/046 701/41 |
| 2010/0211265 A1 | 8/2010 | Iwatu et al. | |
| 2011/0276225 A1 | 11/2011 | Nefcy et al. | |
| 2012/0173080 A1 | 7/2012 | Cluff | |
| 2012/0191284 A1 | 7/2012 | Fehse et al. | |
| 2013/0320893 A1 * | 12/2013 | Aoki | B62D 5/0484 318/400.18 |
| 2014/0039742 A1 * | 2/2014 | Tanaka | B60L 11/007 701/22 |
| 2014/0058630 A1 * | 2/2014 | Kezobo | B62D 5/0472 701/42 |

(Continued)

FOREIGN PATENT DOCUMENTS

| | | |
|---|---|---|
| CN | 103661373 A | 3/2014 |
| JP | 2000335436 A | 12/2000 |

*Primary Examiner* — Kevin Hurley
*Assistant Examiner* — Conan D Duda
(74) *Attorney, Agent, or Firm* — Ray Coppiellie; Brooks Kushman P.C.

(57) ABSTRACT

A system and strategy for reducing rapid steering wheel movement at the end of an autopark maneuver. The strategy includes maintaining or ramping-out power-steering motor torque to reduce steering wheel movement that may occur due to tire windup that has occurred up to that point in the autopark maneuver. The strategy may include the stopping of an autopark maneuver at any time during the maneuver, or functioning at the end of an autopark maneuver. The autopark event may be a park-out maneuver.

8 Claims, 2 Drawing Sheets

(56) References Cited

U.S. PATENT DOCUMENTS

| | | | |
|---|---|---|---|
| 2014/0149000 A1* | 5/2014 | Tamura | B62D 5/0463 |
| | | | 701/42 |
| 2014/0200767 A1* | 7/2014 | Mikamo | B62D 5/0463 |
| | | | 701/41 |
| 2014/0207337 A1* | 7/2014 | Tamaizumi | B62D 5/0463 |
| | | | 701/42 |
| 2014/0300305 A1* | 10/2014 | Itamoto | H02P 6/12 |
| | | | 318/474 |
| 2016/0107690 A1* | 4/2016 | Oyama | B62D 5/046 |
| | | | 701/41 |
| 2017/0274928 A1* | 9/2017 | Minaki | B62D 5/04 |
| 2017/0305459 A1* | 10/2017 | Minaki | B62D 6/00 |
| 2017/0327150 A1* | 11/2017 | Kim | B62D 5/0463 |
| 2018/0170421 A1* | 6/2018 | Minaki | B62D 5/04 |

\* cited by examiner

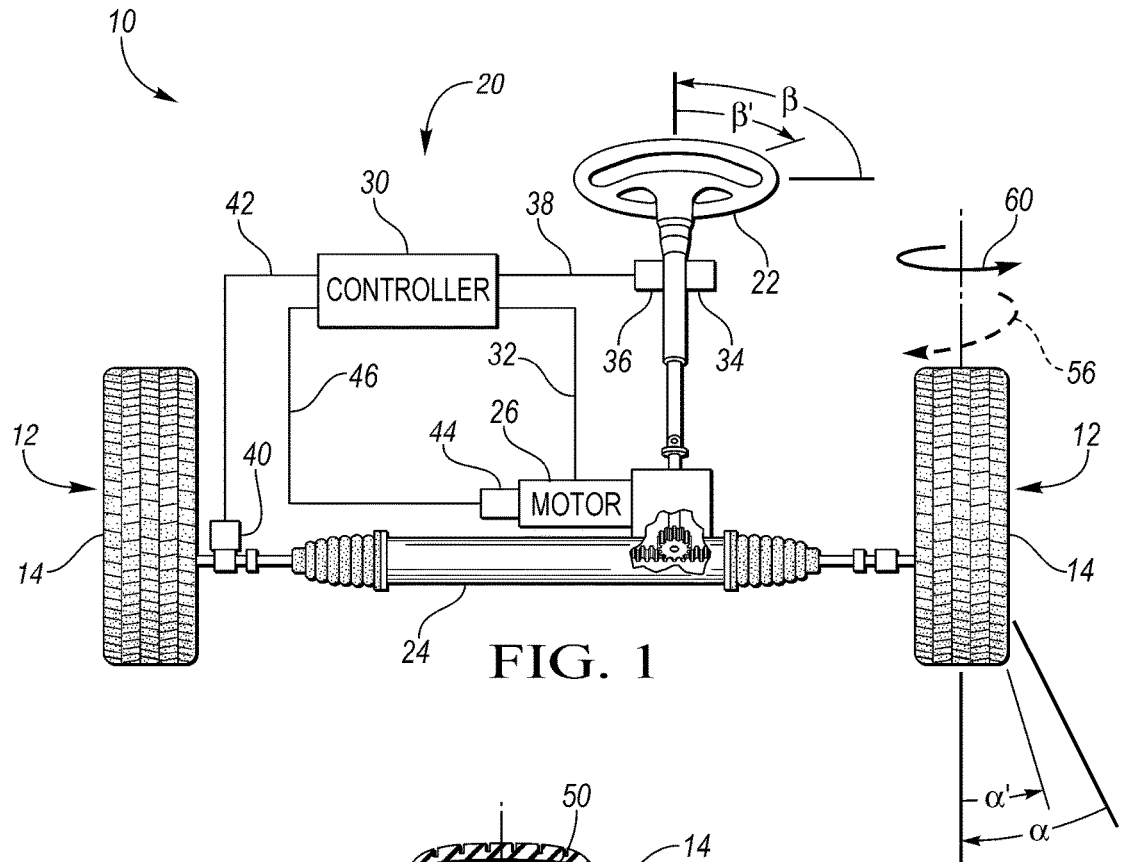
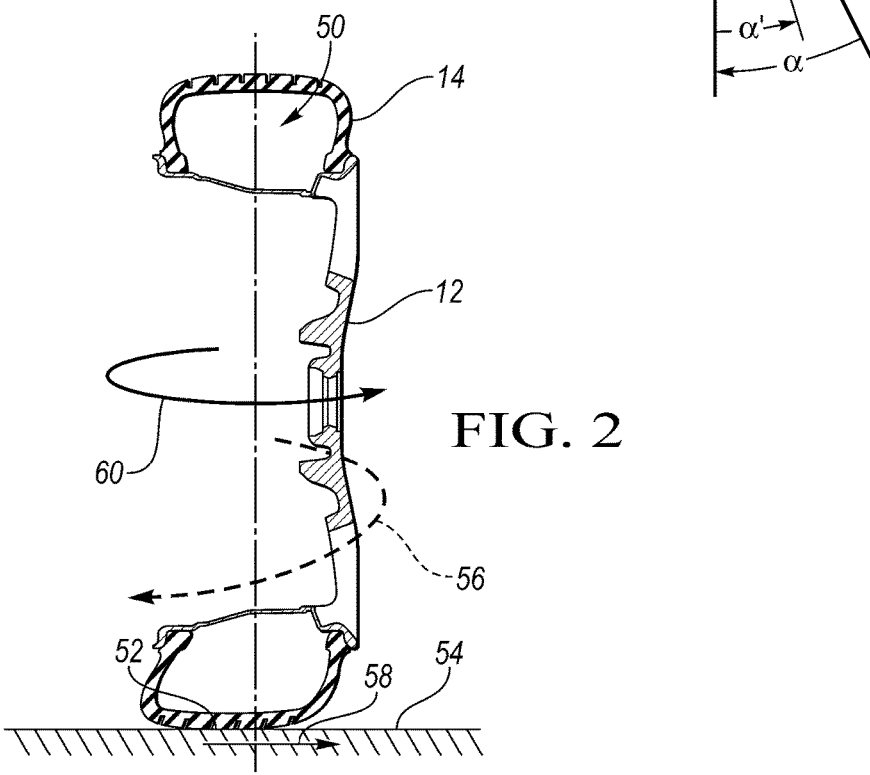
FIG. 1
FIG. 2

AUTOPARK STEERING WHEEL SNAP REDUCTION

TECHNICAL FIELD

This disclosure relates to vehicle steering systems with power assistance and more specifically to the mitigation of the effects of tire windup on a steering system during automatic parking events.

BACKGROUND

A tire is installed on a vehicle wheel to provide traction between the vehicle and the road as well as a flexible cushion to absorb shock. Most tires are pneumatic inflatable structures, comprising a doughnut-shaped body of cords and wires encased in rubber and generally filled with compressed air to form an inflatable cushion.

Due to a tire's construction, a tire may act as a spring and store potential energy when the wheel is turned. This spring-like effect is caused by the friction of the road surface which resists turning of the portion of the tire adjacent a contact patch of the tire with the road. As the wheel is turned, portions of the tire near the wheel turn with the wheel while portions of the tire near the contact patch with the ground may resist the turning motion. As a result, a portion of the tire between the wheel and the contact patch may elastically deform. The elastic deformation of the tire, or more specifically the desire of the tire to return to a non-deformed shape, provides the potential energy referred to as tire windup.

Automatic parking (autopark), also known as Active Park Assist, is an autonomous vehicle maneuvering system that moves a vehicle into (park-in) or out of (park-out) a parking spot. Parking spots may range from parallel, perpendicular or angled parking spots. The autopark system aims to enhance the comfort and safety of driving in constrained environments where much attention and experience is required to steer the car. The parking maneuver is achieved by means of coordinated control of the steering angle and speed which takes into account the actual situation in the environment to ensure collision-free motion within the available space.

Tire windup may be more pronounced when tires are turned on a vehicle when it is moving slowly, or not moving at all, such as when the vehicle is performing an autopark event. During, or at the completion of, an autopark event the windup of the tire may cause the steering wheel angle to snap to a different angle when the power-steering motor ceases to provide torque to the steering system. This may also be referred to as steering wheel jerk. An autopark event may be stopped by an operator grabbing the steering wheel, and if the tire has windup when the power-steering motor releases torque to the steering system, the steering wheel may undesirably snap to a new angle in the hands of the operator.

SUMMARY

One aspect of this disclosure is directed to an autopark system for a vehicle having a power-steering motor, a steering-wheel torque sensor, and a controller coupled to the steering-wheel torque sensor. The power-steering motor is configured to provide steering torque for the vehicle. The steering-wheel torque sensor is configured to detect torque applied to a steering-wheel by an operator. The controller is programmed to, in response to a torque being applied to the steering-wheel during an autopark event, ramp-out the power-steering motor steering torque.

The controller may be programmed to ramp-out the power-steering motor torque over a set duration of time. The controller may be further programmed to return the operation of the power-steering motor to provide steering torque based on driver input to the steering wheel to steer the vehicle. The controller may be further programmed to return the operation of the power-steering motor to provide steering torque based on driver input to the steering wheel to steer the vehicle upon receiving an indication of driver initiated acceleration.

The torque being applied to the steering-wheel during the autopark event to trigger the controller's response may be at or above a threshold torque value. The autopark event may be a park-out event.

Another aspect of this disclosure is directed to a tire windup compensation system for a vehicle. The system has a power-steering motor configured to provide steering torque to front wheels of a vehicle. The system has a steering-wheel torque sensor. The system has a controller coupled to the power-steering motor and steering-wheel torque sensor. The controller is programmed to, in response to a completion of a park-out event, modify power-steering motor steering torque to substantially match steering-wheel torque to compensate for tire windup.

The controller may be further programmed to reduce power-steering motor torque from the steering-wheel torque to zero. The controller may be further programmed to reduce power-steering motor torque at varying rates over a predetermined period of time. The varying rates have an initial rate and a final rate and the initial rate may have a faster torque reduction than the final rate. The controller may be further programmed to reduce power-steering motor torque at a predetermined constant rate. The controller may also be further programmed to maintain power-steering motor torque until receiving an indication of vehicle acceleration.

A further aspect of this disclosure is directed to a vehicle having a pair of turnable wheels, a steering system having steering linkage connecting a steering wheel to the pair of turnable wheels, and a controller programmed to control the steering system to perform an autopark maneuver. The pair of turnable wheels have tires disposed around the wheels. The steering system has a steering-wheel torque sensor configured to monitor steering-wheel torque. The steering system has a power-steering motor coupled with the steering linkage configured to provide torque into the steering system to turn the pair of turnable wheels. The steering system also has a power-steering motor torque sensor configured to monitor power-steering motor torque.

The controller in this aspect is programmed to, upon sensing a driver providing torque to the steering wheel during an autopark maneuver, stop the autopark maneuver and control the power-steering motor to maintain torque on the steering system to compensate for tire windup accumulated during the autopark maneuver.

In this aspect, the autopark maneuver may be a park-out event. The controller may be further programmed to maintain torque on the steering system until the vehicle accelerates. The controller may be further programmed to ramp down the torque being provided to the steering system by the power-steering motor at a controlled rate to prevent steering wheel snap.

The above aspects of this disclosure and other aspects will be explained in greater detail below with reference to the attached drawings.

BRIEF DESCRIPTION OF THE DRAWINGS

FIG. 1 is a diagrammatic view of a vehicular steering system.

FIG. 2 is a cross-sectional view of a wheel and tire on a road surface.

DETAILED DESCRIPTION

Figure 3:
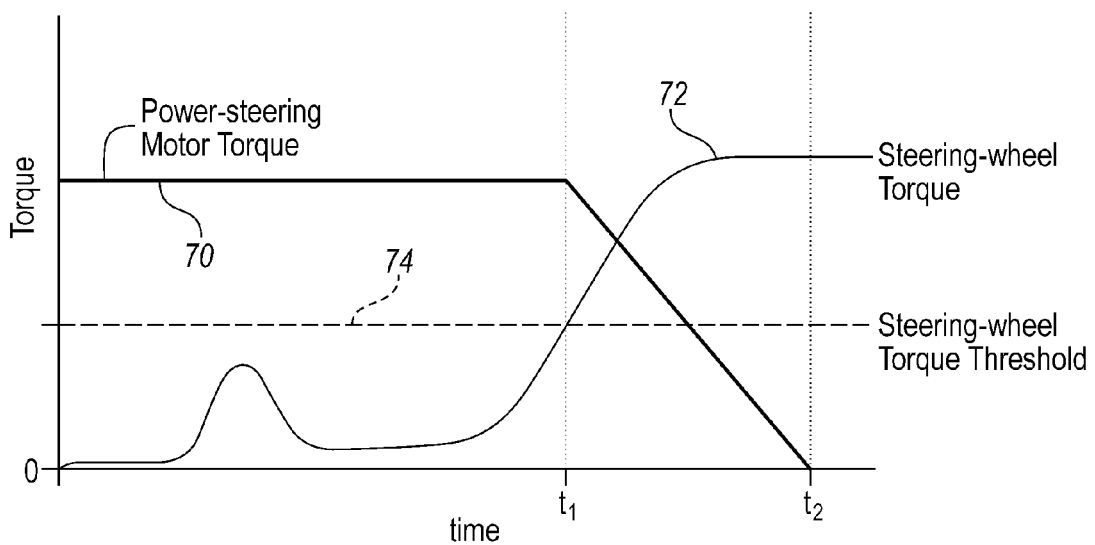
FIG. 3 is a graph of an example of a tire windup control strategy.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

FIG. 1 shows a vehicle 10 having a pair of turnable wheels 12. The wheels 12 have tires 14 disposed around them and may also be referred to as a wheel and tire assembly 12. Wheels 12 may be front wheels 12 on vehicle 10. Vehicle 10 also has a steering system 20. The steering system 20 has a steering wheel 22 in rotatable connection with the wheels 12, through a steering linkage 24. The steering linkage 24 transfers the rotational input of the steering wheel 22 to the wheels 12, and vice versa. The steering linkage 24 may comprise a steering column extending from the steering wheel 22 into a steering gearbox connecting tie rods to knuckles (not shown) to which hub and bearing assemblies (not shown) may be mounted to connect the wheels 12 to the steering wheel 22. The pivotal positions of the wheels 12 are shown as road wheel angle positions α and the corresponding rotational positions of the steering wheel 22 are shown as steering wheel angle positions β.

The angular position in which the road wheel 12 is substantially straight forward is referred to as the zero position, or as such that α is approximately equal to zero degrees. Toe in/out may account for slight variations of angular pivot from true zero, but zero position is intended as the road wheel position that allows the vehicle to track in a substantially straight forward direction. The pivot angle α is then given in degrees away from the zero position, either in a positive, negative or absolute value, as the road wheel 12 pivots away from the zero position in either direction.

The position in which a steering wheel 22 is centered may also be referred to as a zero position, or clear view position. The zero position for the steering wheel 22 is when the steering angle β is approximately equal to zero degrees. The steering wheel 22 may rotate multiple revolutions past the zero position, such that a positive, negative, or absolute value of 360 degrees (or any whole number multiples of 360 degrees) brings the steering wheel 22 back into a clear view position each revolution, but the zero position of the steering wheel 22 is the steering wheel position that corresponds with the zero position of the road wheels 12 (α=β=0).

The steering linkage 24, specifically the steering gearbox, may provide a mechanical advantage from the steering wheel 22 to the road wheel 12. The mechanical advantage of the steering linkage 24 is such that the steering wheel 22 may go through multiple revolutions in a single direction, as described above, while the wheel 12 pivots less than 180 degrees in a single direction from a maximum left turn pivot to a maximum right turn pivot, or vice versa. The steering linkage 24 is diagrammatically shown here as a rack and pinion steering gearbox, although any other may be used. The steering linkage 24 may also provide for a variable ratio steering such that the rate of pivot of the wheel 12 is increased or decreased near the zero position (such as on large heavy duty vehicles) or at the ends of the left hand or right hand turning spectrums (such as on smaller automobiles and passenger cars).

A power-steering motor 26 may be coupled with the steering linkage 24 and used to assist in the turning of the wheels 12. The power-steering motor 26 is configured to provide torque into the steering system to turn the wheels 12 on the vehicle 10. Power-steering motor 26 may be an electronic power assist motor used to provide power assistance to aid in the turning of the wheels 12 when a driver turns the steering wheel 22, or may be a motor capable of executing an autopark event, in which the motor 26 turns the wheels 12 while the vehicle performs an automatic computer controlled parking event with no input from the driver.

The motor 26 is in communication with and activated by a controller 30, as shown by communication line 32. Said another way, the controller 30 may be coupled with the power-steering motor 26 via the communication line 32. The steering system 20 may also be provided with a number of different sensors to provide data to the controller 30 on movement and state of various components within the system. A steering-wheel angle sensor 34 and a steering-wheel torque sensor 36 may be in communication with the controller 30 as indicated by communication line 38. Each sensor 34, 36 may have their own communication line, or they may be combined into a single communication line. Said another way, the controller 30 may be coupled with the steering-wheel angle sensor 34 and/or the steering-wheel torque sensor 36 via the communication line 32. The steering-wheel angle sensor 34 may be capable of providing data relative to a steering component movement such as the angular position β of the steering wheel 22. The steering-wheel torque sensor 36 may be configured to monitor steering wheel torque and to detect torque applied to a steering wheel 22 by an operator.

A road-wheel angle sensor 40 may be in communication with the controller 30 as indicated by communication line 42. Said another way, the controller 30 may be coupled with the road-wheel angle sensor 40 via the communication line 42. The road-wheel angle sensor 40 may be connected to various steering linkage components 24 such that it is capable of providing data relative the angular position α of the wheels 12. A power-steering motor torque sensor 44 may be in communication with the controller 30 as indicated by communication line 46. Said another way, the controller 30 may be coupled with the power-steering motor torque sensor 44 via the communication line 46. The power-steering motor torque sensor 44 may be configured to monitor torque being supplied to the steering linkage 24 by the power-steering motor 26. Communication lines 32, 38, 42, 46 may be hard wired connections, wireless connections, may be directly connected between the controller 30 and the respective component, or may be connected to the controller through other systems and/or a vehicle communication system (not shown), such as a CAN BUS.

FIG. 2 shows a cross-section of a wheel 12 and tire 14. The wheel 12 is semi-ridged structure typically made of metal that does not experience noticeable elastic deformation during parking events. The tire 14, on the other hand, may be a rubbery pneumatic inflatable structure generally filled with compressed air 50 to form an inflatable cushion. Due to the tire's construction, the tire 14 may act as a spring and store potential energy when the wheel 12 is turned. The tire 14 has a contact patch 52 where the tire 14 contacts the ground 54.

As the wheel 12 is turned by the steering system 20, as indicated by dashed arrow 56, the frictional forces 58 between the contact patch 52 and the ground 54 resist the turning motion 56. The spring-like construction of the tire 14 allows for elastic deformation to occur and the elastic deformation of the tire 14 provides a potential energy to try and return the road wheel 12 back in the opposite direction. The potential energy formed in a tire 14 due to elastic deformation of the tire 14 as a result of the frictional forces 58 of the contact patch 52 with the ground 54 is known as tire windup. The desire for the wheel 12 to turn back in the opposite direction by the tire windup is shown by solid line 60. If all torque is removed from the steering system 20 while tire windup exists, the wheels may turn as indicated by solid line 60. In other words, the wheel 12 may be turned to $\alpha$ and then due to tire windup, when torque to the system is relieved, the wheel 12 may turn to $\alpha'$. The turning of the tire from $\alpha$ to $\alpha'$ may turn the steering wheel 22 from $\beta$ to $\beta'$. The turning of the steering wheel 22 from $\beta$ to $\beta'$ may happen quickly and be referred to as steering wheel snap.

Referring to FIGS. 1 and 2, as the vehicle 10 completes an autopark maneuver, a predetermined final road-wheel angle $\alpha$ may be desired, however, due to the tire windup (the tendency to turn back in the other direction as indicated by dashed arrow 60), the wheel 12 may turn from $\alpha$ to $\alpha'$ when the steering system 20 relaxes. The turning of the wheel 12 from $\alpha$ to $\alpha'$ may turn the steering wheel 22 from $\beta$ to $\beta'$. A solution to this problem may be to utilize the power-steering motor 26 to maintain torque on the steering linkage 24 to maintain the desired predetermined wheel angle $\alpha$ and thus maintain the steering-wheel angle $\beta$. Another solution to this problem may be to utilize the power-steering motor 26 to ramp-out or reduce the torque on the steering linkage 24 at a predetermined rate. These solutions reduce concern for steering-wheel snap or jerk.

The controller 30 may be coupled to the steering-wheel torque sensor 36, and programmed to, in response to a torque being applied to the steering wheel 22 during an autopark event, end the autopark event. The torque being applied to the steering wheel 22 to end an autopark event may be at or above a threshold torque value to prevent premature ending of an autopark event such as if the steering wheel 22 was lightly dragged and not fully grasped by the operator.

Upon the early ending of the autopark event, the wheel 12 may have tire windup. As such, the controller 30 may be programmed to ramp-out the power-steering motor 26 steering torque to reduce steering-wheel snap or jerk. The controller 30 may be programmed to ramp-out the torque being supplied by the power-steering motor 26 to the steering linkage 24 over a set duration of time. The controller 30 may be programmed to ramp-out the torque being supplied by the power-steering motor 26 to the steering linkage 24 at a set or varying rate. The ramp-out rate may be tunable. Alternatively, the controller 30 may be programmed to adjust the power-steering motor torque to a value that holds the wheels 12 at the present road-wheel angle $\alpha$ such that the wheels 12 do not turn.

The controller 30 may then also be further programmed to return the operation of the power-steering motor 26 to provide steering torque to a driver while turning the steering wheel 22 (typical operation outside of an autopark event). This may be done over a set period of time, or the controller 30 may be further programmed to return the operation of the power-steering motor 26 to provide steering torque to a driver upon receiving an indication of driver initiated acceleration.

The controller 30 may be programmed to, in response to the completion of an autopark maneuver, modify power-steering motor steering torque to substantially match steering-wheel torque to compensate for tire windup. The controller 30 may be further programmed to reduce power-steering motor torque from the steering-wheel torque to zero. The controller 30 may be further programmed to reduce power-steering motor torque at varying rates over a predetermined period of time. The varying rates may have an initial rate and a final rate and the initial rate may have a faster torque reduction than the final rate. The controller 30 may also be further programmed to reduce power-steering motor torque at a predetermined constant rate. As such, the ramp-out rate of the power-steering motor torque may be tunable based on many different criteria. As well, the ramp-out rate for an end of a fully executed autopark event may be different from the ramp-out rate of an early ended autopark event. The ramp-out rate may also be different for a park-in event versus a park-out event and whether the event was for parallel, perpendicular or angled parking spots. The controller 30 may also be further programmed to maintain power-steering motor torque until receiving an indication of a driver assuming control of the vehicle, such as, but not limited to, vehicle acceleration.

The controller 30 may be programmed to control the steering system 20 to perform an autopark maneuver and, upon sensing a driver providing torque to the steering wheel 22, stop the autopark maneuver and control the power-steering motor 26 to maintain torque on the steering linkage 24 to compensate for tire windup accumulated during the auto-park maneuver. The autopark maneuver may be a park-in maneuver or a park-out maneuver. The controller 30 may be programmed to ramp-out the power-steering motor torque upon completion of an autopark event. The controller 30 may be further programmed to maintain torque on the steering system until the vehicle accelerates. In all, the controller is programmed to maintain or ramp down the torque being provided to the steering system 20 by the power-steering motor 26 to prevent steering wheel snap. Thus at the end of the autopark event, the controller 30 may alert the driver to assume control of the vehicle and manage any tire windup that may have accumulated during the autopark event to mitigate steering wheel snap or jerk when the driver takes control.

FIG. 3 is a graph of an example of a tire windup control strategy during an autopark event. While the autopark event is occurring, the power-steering motor may be providing a power-steering motor torque 70 as indicated by line 70. The power-steering motor torque 70 may be provided by a power-steering motor 26 (FIG. 1) and a controller 30 (FIG. 1) may receive an indication of the power-steering motor torque 70 from a power-steering motor torque sensor 44 (FIG. 1). Steering-wheel torque 72 may occur over time. A steering-wheel torque threshold value 74 may be set, in which no change to the normal operation of the autopark event would occur until steering-wheel torque achieves or surpasses this threshold value, as can be seen occurring at time $t_1$. At time $t_1$, the power-steering motor torque may be ramped-out to zero at time $t_2$. The ramp-out may be at a constant rate, as shown here, or may be done at varying rates.

Figure 4:
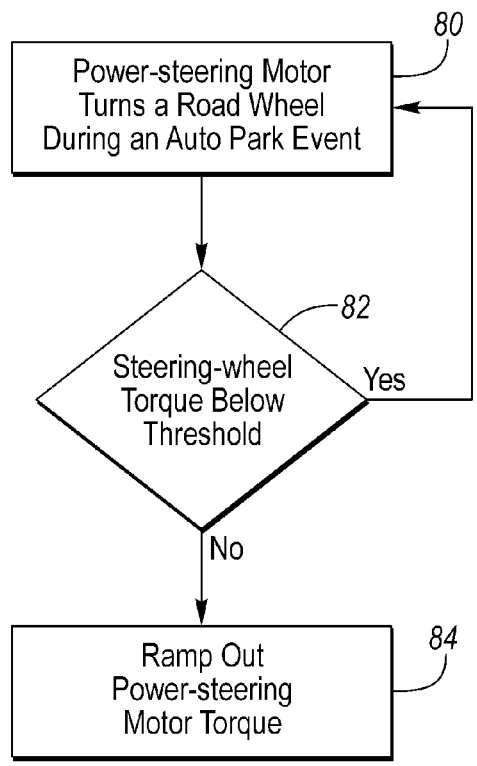
FIG. 4 is a flow chart of an example of a tire windup control strategy.

FIG. 4 is a flow chart of an example of a similar tire windup control strategy during an autopark event. At step 80, the power-steering motor turns wheels on a vehicle during an autopark event. At decision diamond 82, the strategy monitors if a steering-wheel torque is below a threshold value. If the steering-wheel torque is below the threshold value, then the flow returns to step 80 and continues to du-loop until the autopark event is completed. If the steering-wheel torque achieves or surpasses the threshold value, then the flow moves to step 84 where a power-steering motor has its torque ramped-out. The steering-wheel torque threshold value may be set at a value similar to that of an operator lightly grabbing the steering wheel. The ramping-out of the power-steering motor torque may reduce any steering wheel snap that may occur due to any tire windup that may have occurred during the autopark event.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle comprising:
   a power-steering motor configured to provide steering torque;
   a motor-torque sensor configured to detect torque being supplied by the power-steering motor;
   a steering-wheel torque sensor; and
   a controller programmed to, in response to the steering-wheel torque sensor detecting a torque being applied to the steering-wheel during an autopark event, end the autopark event and subsequently reduce the power-steering motor steering torque at varying rates over a predetermined period of time.

2. The autopark system of claim 1 wherein the controller is further programmed to return the operation of the power-steering motor to provide steering torque based on driver input to the steering wheel to steer the vehicle.

3. The autopark system of claim 2 wherein the controller is further programmed to return the operation of the power-steering motor to provide steering torque based on driver input to the steering wheel to steer the vehicle upon receiving an indication of driver initiated acceleration.

4. The autopark system of claim 1 wherein the torque being applied to the steering-wheel during an autopark event is at or above a threshold torque value.

5. The autopark system of claim 1 wherein the autopark event is a park-out event.

6. A vehicle comprising:
   a motor configured to provide power-steering torque;
   a first sensor configured to detect the power-steering torque;
   a steering wheel;
   a second sensor configured to detect torque applied to the steering wheel; and
   a controller programmed to, in response to the second sensor detecting torque applied to the steering wheel, end an autopark event and then controllably reduce the power-steering torque to zero at varying rates over time.

7. The vehicle of claim 1, wherein the varying rates includes an initial rate and a final rate, the initial rate having a faster torque reduction than the final rate.

8. The vehicle of claim 6, wherein the varying rates includes an initial rate and a final rate, the initial rate having a faster torque reduction than the final rate.

* * * * *